United States Patent [19]

Shapiro

[11] Patent Number: 4,744,955

[45] Date of Patent: May 17, 1988

[54] ADJUSTABLE VOLUME PIPETTE SAMPLER

[76] Inventor: Justin J. Shapiro, c/o Labindustries, Inc., 620 Hearst Ave., Berkeley, Calif. 94710-1992

[21] Appl. No.: 894,809

[22] Filed: Aug. 8, 1986

[51] Int. Cl.⁴ .......................... B01L 3/02; G01N 1/14

[52] U.S. Cl. ...................................... 422/100; 422/70; 73/864.13; 73/864.14; 73/864.18; 604/187; 604/190; 604/208; 604/218

[58] Field of Search .................. 422/100, 70; 604/187, 604/207, 208, 211, 218, 190; 73/864.13, 864.14, 864.18

[56] References Cited

U.S. PATENT DOCUMENTS

| | | | |
|---|---|---|---|
| 1,433,075 | 10/1922 | Gottlieb | 422/100 |
| 2,130,305 | 9/1938 | Lewis | 604/218 |
| 2,250,467 | 7/1941 | Cole | 604/211 |
| 2,530,909 | 11/1950 | Riggs | 73/864.18 |
| 3,099,260 | 7/1963 | Birtwell | 604/153 |
| 3,180,527 | 4/1965 | Wasilewski et al. | 422/100 |
| 3,184,122 | 5/1965 | Nerenberg | 422/100 |
| 3,192,969 | 7/1965 | Baruch et al. | 422/100 |
| 3,232,117 | 2/1966 | Gilmont | 73/864.13 |
| 3,325,061 | 6/1967 | Ellsworth | 604/218 |
| 3,805,998 | 4/1974 | Croslin | 422/100 |
| 3,841,835 | 10/1974 | Kishimoto et al. | 422/70 |
| 4,098,125 | 7/1978 | Lee | 73/864.18 |
| 4,180,071 | 12/1979 | Oiwa | 604/190 |
| 4,207,889 | 6/1980 | Ofoff et al. | 604/152 |
| 4,283,950 | 8/1981 | Tervamäki | 422/100 |
| 4,543,094 | 9/1985 | Barnwell | 604/89 |
| 4,629,561 | 12/1986 | Shirato et al. | 422/70 |

FOREIGN PATENT DOCUMENTS

| | | | |
|---|---|---|---|
| 144483 | 6/1985 | European Pat. Off. | 604/187 |

OTHER PUBLICATIONS

Becton, Dickinson Co., "Now Take Your Choice" (1962), New Jersey.

*Primary Examiner*—David L. Lacey
*Attorney, Agent, or Firm*—Browdy and Neimark

[57] ABSTRACT

An adjustable volume sampler or syringe comprises a pair of barrels axially aligned and retained together by complementary screw threads. The volume is controlled by relative rotation of the barrels. Coupling mechanisms are provided at an outlet end of one of the barrels for attaching a second cylinder or other accessories.

16 Claims, 5 Drawing Sheets

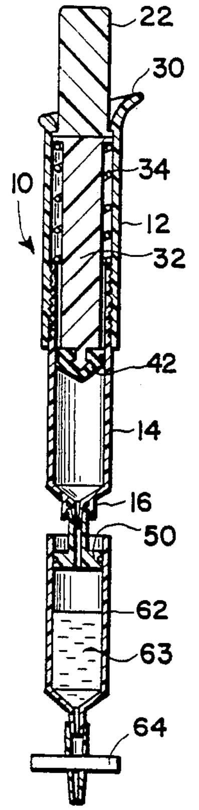
FIG. 11
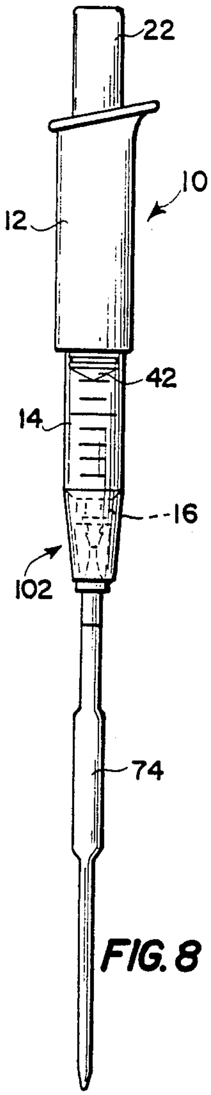
FIG. 8
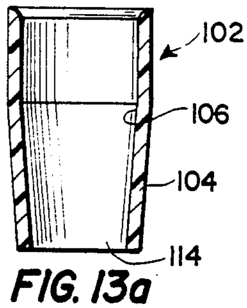
FIG. 13a
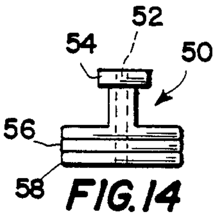
FIG. 14
FIG. 13b
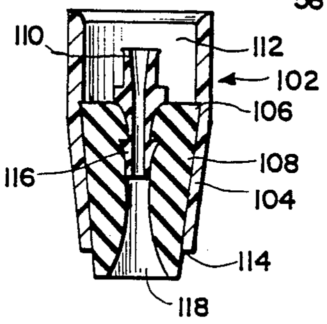
FIG. 22
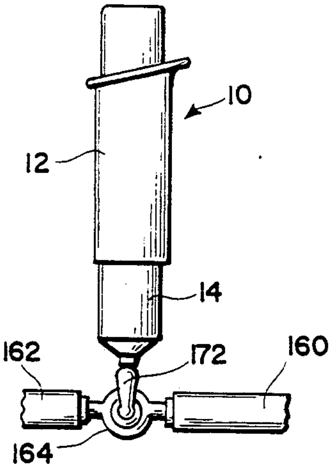
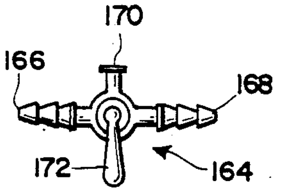
FIG. 23

ADJUSTABLE VOLUME PIPETTE SAMPLER

FIELD OF THE INVENTION

The present invention relates to adjustable volume pipette samplers or syringes, and accessories for use therewith, particularly useful in conjunction with high pressure liquid chromatography (HPLC) and the filtration of various liquid samples.

BACKGROUND OF THE INVENTION

Adjustable volume pipettes and syringes have been wellknown for many years. These devices usually include means for adjusting the stroke of the plunger shaft or plunger within the pipette barrel to precisely calibrate the pipette volumetric capacity. For example, U.S. Pat. Nos. 2,530,909 to Riggs; 3,815,790 to Allen et al; and 4,084,730 to Franke et al all disclose adjustable volume pipetting devices having stop means to limit the travel of the plunger shaft thereby varying the pipette volumetric capacity. While these above-mentioned pipetting devices may vary the volume of liquid or reagent to be dispensed therefrom, the stop means will prevent complete downward axial displacement of the plunger shaft towards the dispensing end of the barrel. These structural arrangements thereby permit spaces to exist between the plunger and the dispensing end of the barrel, causing slight inaccuracies in the volume of liquid samples to be dispensed, providing non-positive displacement.

Attempts have been made to vary the size of the barrel by using a threadedly engaging sleeve extension. For example, U.S. Pat. No. 3,232,117 to Gilmont and U.S. Pat. No. 4,098,125 to Lee both show adjustable volume pipetting devices which include means to vary the volume capacity of the barrel by providing a threadedly engaging sleeve or extension thereto. However, these devices employ relatively complex and expensive structures for facilitating extension or contraction of the pipette barrel.

In recent years, attempts have been made to insure precise and uncontaminated pipette sampling by adding disposable tube tips to the barrel dispensing end, which tips receive samples therein without contacting the pipette plunger chamber. Samples are discharged through the tips by positive displacement of the plunger. For example, U.S. Pat. Nos. 4,023,716 and 4,165,646 to Shapiro both disclose sampling pipettes which include the use of disposable tips attached to the pipette barrel dispensing end for incorporating a non-contaminated environment for storing liquid samples.

No adjustable volume pipette sampler or syringe especially adapted for use with accessories has previously been available which will enable quick, simple and inexpensive sampling of liquids with precision and greater assurance of absence of contamination. There is a greatly need for an adjustable volume pipetting device, especially one with two colinear and relatively adjustable barrels, which will permit easy attachment of accessories, such as filtering devices and/or disposable high volume capacity reservoirs. Additionally, an adjustable volume pipette sampler or syringe capable of using either positive or air displacement would great benefit the bio-engineering (and other like science) sample testing industries. Furthermore, there is a need for coupling means to attach the various accessories to the pipetting device, especially in instances where high pressure is desired, such as is required in high pressure liquid chromatography (HPLC).

SUMMARY OF THE INVENTION

Accordingly, it is an object of the present invention to overcome deficiencies of the prior art, such as those set forth above.

It is another object to provide for improved repetitive sampling.

It is a further object of the present invention to provide an improved adjustable volume pipette sampler or syringe.

It is yet another object of the present invention to provide an adjustable volume pipette sampler or syringe which includes a disposable reservoir.

It is still another object of the present invention to provide coupling means for attaching various accessories to an adjustable volume pipette sampler or syringe.

It is yet a further object of the present invention to provide an adjustable volume pipette sampler or syringe which facilitates quick, simple and inexpensive sampling of liquids with precision and absence of contamination.

It is still a further object of the present invention to provide an adjustable volume pipette sampler for use in conjunction with high pressure liquid chromatography (HPLC) which permits unattended manual pressurization.

Still other objects, features and attendant advantages of the present invention will become apparent to those skilled in the art from a reading of the following detailed description of certain preferred embodiments thereof, taken in conjunction with the accompanying drawings, wherein:

BRIEF DESCRIPTION OF THE DRAWINGS

FIG. 8 is an elevational view of an adjustable volume pipette sampler of the present invention, illustrating the use of a pipette filling and adjusting accessory;

FIG. 11 is a vertical cross-sectional view of the adjustable volume sampler taken along line 11—11 in FIG. 5, showing accessories for use in sequential sampling and filtering;

FIG. 13*a* is a vertical cross-sectional view of an extension portion of a coupling device for use with the present invention;

FIG. 13*b* is a vertical cross-sectional view of an interior portion of a coupling device for use with the present invention;

FIG. 14 is an elevational view of an O-ring coupling employed in the present invention;

FIG. 22 shows the sampler connected, by means of a three-way valve, in a closed or pressurized system; and FIG. 23 is a front elevational view of a suitable three-way valve used in the FIG. 22 embodiment.

DESCRIPTION OF THE PREFERRED EMBODIMENT

Figure 1:
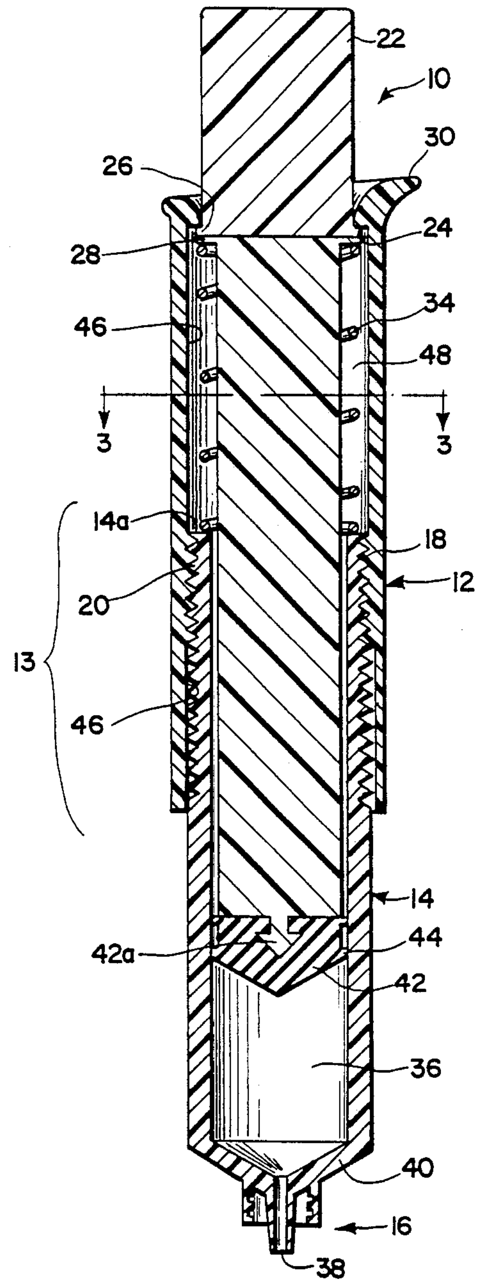
FIG. 1 is a vertical cross-sectional view of an adjustable volume pipette sampler according to the present invention.
Figure 2:
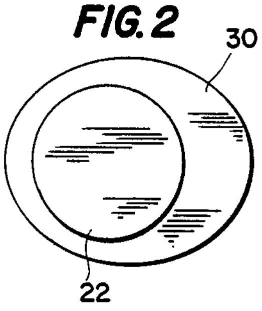
FIG. 2 is a plan view of the adjustable volume pipette sampler of FIG. 1.
Figure 3:
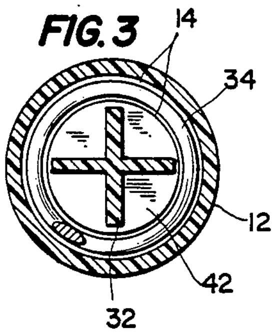
FIG. 3 is a cross-sectional view of the adjustable volume pipette sampler taken along the line 3—3 in FIG. 1.

A presently preferred embodiment of the present invention is illustrated in FIGS. 1-3 and comprises an adjustable volume sampler or syringe 10 having an expandable or contractible barrel 13, with an internal space 48.

The barrel 13, of a substantially tubular or cylindrical configuration, includes an upper cylindrical member 12 having an interior wall 46 with a first inner diameter, and a lower member 14 having a second, slightly smaller inner diameter, the upper member 12 being provided near its lower end with internal peripheral threads 18. The lower member 14 is provided at its upper end with exterior peripheral threads 20, the lower member 14 being adapted to be inserted within the lower end of the upper member 12, so that upon turning either member 12 or 14, threads 18, 20 will engage with one another thereby forming an adjustably varying volume barrel 13.

Figures 4, 5, 6, 7, 9, 10, 12:
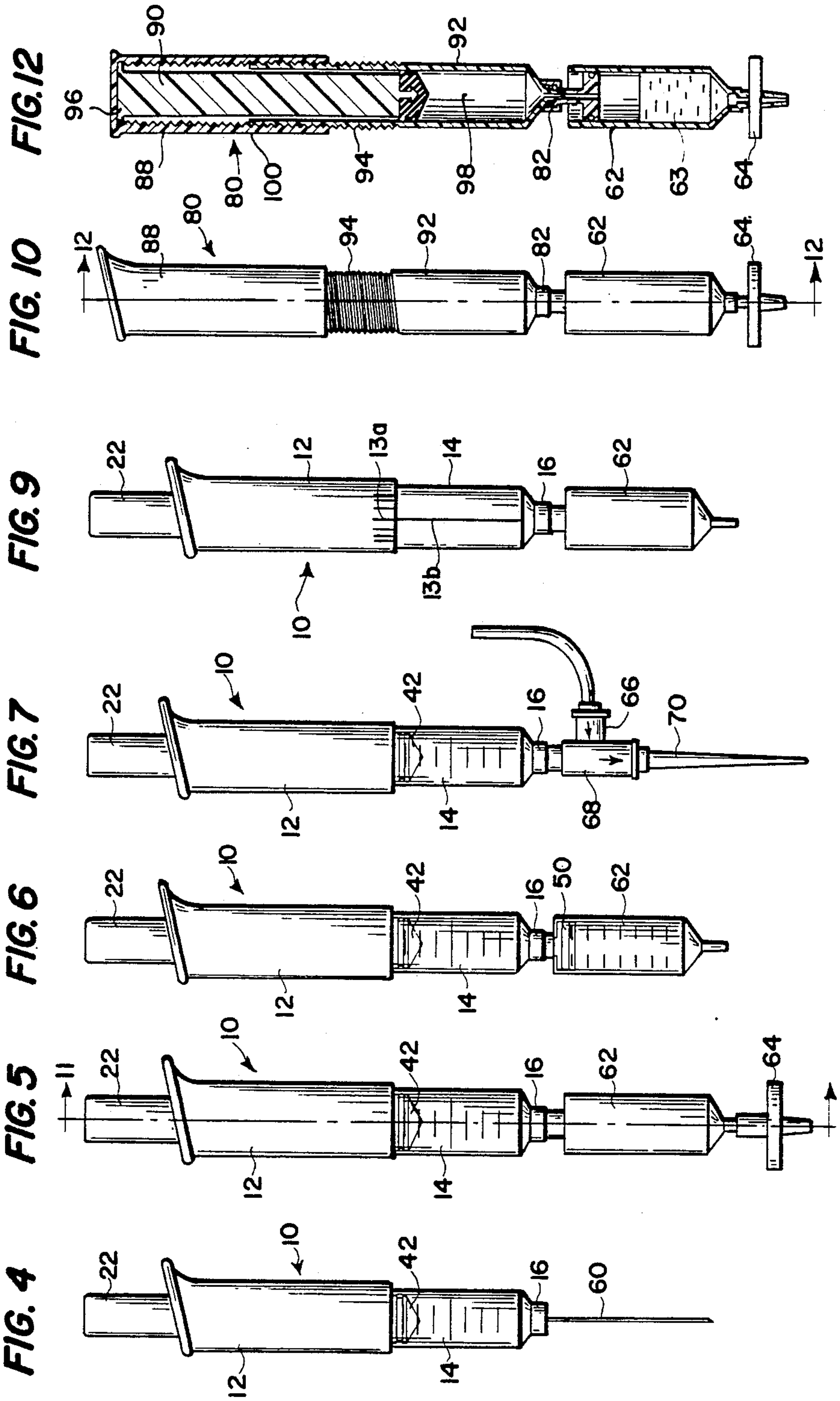
FIG. 4 is an elevational view of an adjustable positive displacement volume syringe according to the present invention, illustrating a hypodermic needle accessory attachment secured to the syringe dispensing end.
FIG. 5 is an elevational view of an adjustable volume pipette sampler of the present invention, illustrating securement of a disposable reservoir and filtering accessory attachments for use in conjunction with sequential sampling and filtering.
FIG. 6 is an elevational view of an adjustable volume pipette sampler of the present invention, showing a disposable reservoir accessory attachment for use in air displacement sampling with zero carryover.
FIG. 7 is an elevational view of an adjustable volume pipette sampler of the present invention, illustrating accessory attachments for use in conjunction with repetitive remote sampling dispensing.
FIG. 9 is an elevational view of an adjustable volume pipette sampler or syringe of the present invention, showing the use of a Vernier Scale to aid adjustment of the volume capacity of the sampler barrel.
FIG. 10 is an elevational view of a modified adjustable volume sampler of the present invention, illustrating a pressure device accessory for filtration of reagent in the disposable reservoir.
FIG. 12 is a vertical cross-sectional view of the adjustable volume sampler taken along line 12—12 in FIG. 10.
Figure 15:
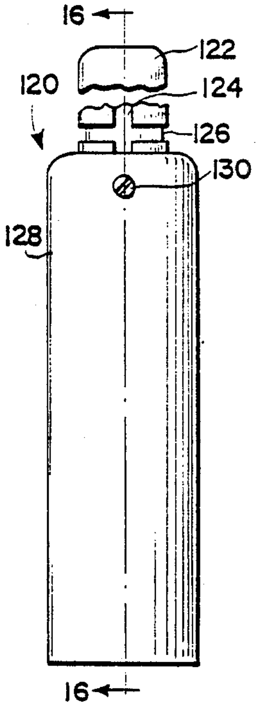
FIG. 15 is an elevational view of a high pressure liquid chromatography modified sampling system of the present invention.
Figure 16:
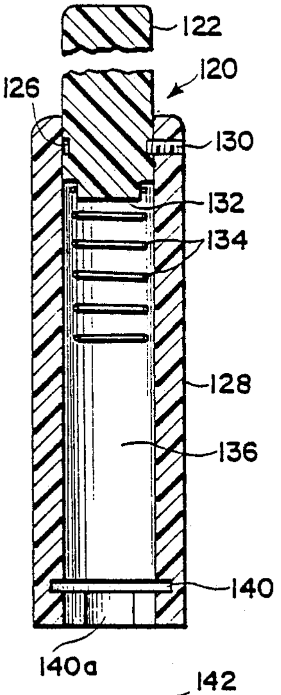
FIG. 16 is a vertical cross-sectional view of the high pressure liquid chromatography modified sampling system taken along line 16—16 in FIG. 15.
Figure 18:
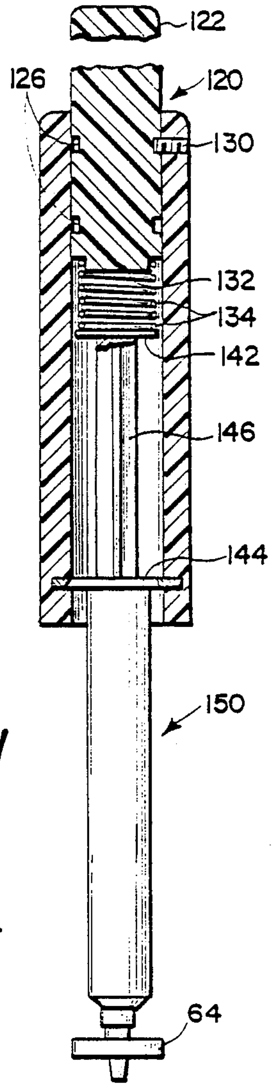
FIG. 18 is a partial cross-sectional view of an high pressure liquid chromatography modified sampling system of the present invention, displaying a syringe mounted thereto.
Figure 19:
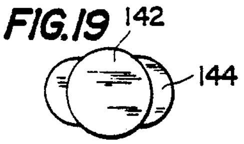
FIG. 19 is a plan view of a syringe employed in the present invention.
Figure 20:
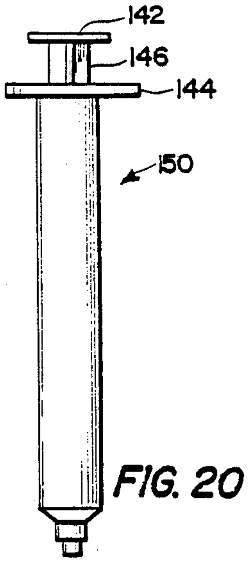
FIG. 20 is an elevational view of the syringe of FIG. 19 employed in the present invention, showing the plunger shaft in the discharge position.
Figure 21:
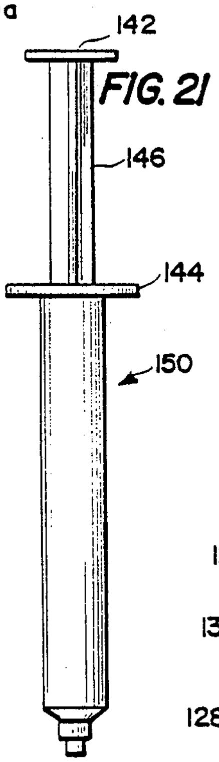
FIG. 21 is an elevational view of the syringe of FIG. 19 employed in the present invention, showing the plunger shaft in the extended position.
Figure 17:
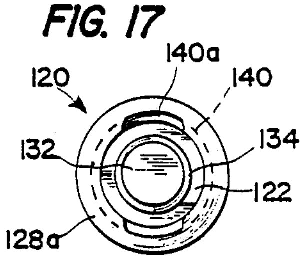
FIG. 17 is a bottom plan view of the high pressure liquid chromatography modified sampling system.

The volume capacity of the barrel 13 may be increased by either turning member 12 in a clockwise direction or by turning member 14 in a counter-clockwise direction. Likewise, the volume capacity of the barrel 13 may be decreased by either turning member 12 in a counter-clockwise direction or by turning member 14 in a clockwise direction. It can be seen that the upper and lower barrel members, upon rotation, cause axial displacement of the members in either direction away from one another or towards one another along the longitudinal axis of the barrel. Accordingly, barrel 13 can be contracted or expanded as desired to meet with specific predetermined volumetric capacities. As best illustrated in FIG. 9, a Vernier Scale 13*a*, 13*b* may be provided on the lower portion of upper barrel member 12 and on the upper portion of lower barrel member 14, to aid the user in facilitating a precise volumetric barrel adjustment.

The upper and lower barrel members 12 and 14 may be made from any suitable and usual material for this purpose, such as from plastic or metal or glass, such that the barrel when assembled or disassembled maintains rigid or semi-rigid characteristics; in other words, the barrel should be formed of materials which will not readily deform under pressurized conditions. It should be understood that the upper barrel member 12 may be a permanent non-disposable barrel member, whereas the lower member 14 may be of the disposable throw-away type. Furthermore, upper and lower barrel members can be formed of transparent or translucent plastic materials or even glass so that users may have the ability to directly view reagents or samples held within the barrel 13.

As best shown in FIGS. 1 and 2, the upper barrel member 12 at its top or upper end includes an ergonomically shaped finger flange 30 integrally formed perpendicular to the barrel's longitudinal axis. The flange 30 is substantially oval in sahpe (see FIG. 2) to facilitate comfortable holding of the barrel by the user's hand. The bottom of the flange 30 additionally is provided with an annular shoulder 24, which extends perpendicular to the longitudinal axis of the barrel.

Lower barrel member 14 at its lower or bottom end includes an integrally formed dispensing outlet 38 incorporated with an accessory coupling means 16. The lower portion of barrel member 14 is provided with a sloped or tapered end 40 to direct reagents or samples towards the dispensing outlet 38.

Within the interior 48 of the barrel 13 is provided a plunger assembly which essentially comprises three members, namely a push button operator 22, a plunger shaft 32, and an elastomeric plunger 42 provided with a circumferentially surrounding flange or protrusion 44. The plunger 42 is mounted to the bottom of plunger shaft 32 by conventional securing means 42*a*. The top portion of plunger shaft 32 includes a flat or flanged surface 28 for abutting engagement with a lower flat end 26 of the push button operator 22.

The plunger shaft 32 includes a circumferentially surrounding spring 34 which extends axially between the flange of the flanged surface 28 at the top of the shaft 32 and an upper shoulder 14a provided at the upper end of the lower barrel member 14. The spring 34 urges the plunger shaft in an upward longitudinal direction and abuts the plunger's flanged surface 28 into contact with the flat end 26 of the push button, thereby biasing the flat end 26 into engagement with the shoulder 24. This forms a stop means for limiting the upward travel of the plunger shaft 32 and the push button 22. It should be understood that the plunger shaft 32 and the push button operator 22 may be of an integrally formed unitary structure, as long as a flange or stop means is incorporated therewith to abut with shoulder 24 of the barrel 13 thereby limiting the upward axial displacement of the plunger assembly.

When the plunger assembly is in its uppermost, spring-biased, resting position, a cavity 36 is provided between the plunger 42 and the barrel dispensing outlet 38. Upon depression of the plunger button by a thumb or finger of the same hand holding the sampler, the plunger shaft and plunger will displace in a downward axial direction causing a sample or reagent within an accessory reservoir or within the barrel 13 to be expelled therefrom through the outlet 38. The plunger shaft 32 may be of the cross type, such as shown in cross-section in FIG. 3.

Referring now to FIGS. 4–8 and 11, there are shown accessory attachments for use with the sampling device of the present invention. Thus, FIG. 4 illustrates a precise repetitive positive displacement syringe with an extended tip or hypodermic needle 60 attached to the dispensing outlet 38 and accessing coupling means 16 of the lower barrel member 14. This assembly is particularly useful for suffers of arthritis and/or diabetics who are benefitted by the easy and simple one-handed operation of this syringe, which is operated by depression of the push button plunger assembly by a single finger or thumb, the spring 34 automatically returning the plunger 42 to the pre-set position defining a selected volume.

According to FIG. 5, the sampler 10 can be provided with a disposable reservoir 62 (also see FIGS. 6 and 11) facilitating repetitive displacement sampling witih zero carryover. According to FIG. 6, a Luer adapter 50 (see FIG. 14) is coupled to the dispensing end of the sampler via the coupling means 16 to mount the disposable reservoir 62 to the sampler. The Luer adapter 50 includes a cylindrical portion 58 incorporated with an "O"-ring 56, and a neck portion 54 which mates with dispensing outlet 38 and an accessory coupling means 16. The Luer adapter is equipped with a fluid passage 52 to permit air or fluid to pass therethrough, while maintaining an air-tight connection between the sampler 10 and the disposable reservoir 62.

In operation, noting FIG. 11, a preset volume of a first liquid sample 63 is drawn into the reservoir 62 and then subsequently discharged into a container, after which the reservoir is removed and discarded. When the device is to be used again to transfer a selected quantity of a second liquid where contamination with the first liquid is to be avoided, a fresh or new reservoir 62 is attached and the operation is repeated. Since no liquid, e.g. reagent, enters the barrel 13 or contacts the adapter 50, there is none of the first liquid sample remaining to contaminate the next or following liquid samples.

Furthermore, a filter 64 may be attached to the disposable reservoir 62 to perform sequential sampling and filtering of liquid samples 63 under pressure with zero carryover (see FIGS. 5 and 11). After the liquid sample has been aspirated into the reservoir 62, the disposable filter 64 is connected to the bottom of the reservoir. The assembly, such as shown in FIGS. 5 and 11, is placed in a rack over a collection vessel, and the barrels 12 and 14 are then counter-rotated to reduce the volume of the cavity 36 and develop pressure above the liquid sample. The assembly is left in place to collect the filtrate. Subsequently, the reservoir 62 and filter 64 may be discarded and the operation repeated with a new reservoir and filter and a new sample.

FIG. 7 illustrates repetitive remote dispensing. A valve assembly 68 with dispensing tip 70 and with Luer fittings is attached to the sampler 10 to facilitate repetitive equal and precise volume dispensing. The valve 68 also controls an infeed branch coupler 66 for an infeed line, such as at the side as shown. Again the accessory coupling means 16 and infeed branch coupler 66 permits multiple uses of the sampler 10.

As shown in FIG. 8, the sampler 10 can be employed at a pipette filling and adjusting device, thereby eliminating mouth pipetting. A coupling member such as a Luer fitting 110 is fixed within a pipette adapter 102 (see FIGS. 13*a* and 13*b*) and provides an air-tight connection between the sampler 10 via its coupling means 16, and a pipette 74. The pipette 74 may be filled exactly to the desired volume by releasing the plunger and rotating the barrel 13 to bring the meniscus to the calibrated line provided on the pipette 74. The pipette adapter 102 includes a generally tubular shell 104 having an inlet 112 and an outlet 114. The inner periphery of the shell is provided with an annular shoulder or ridge 106 which allows for the insertion of a rubber or soft elastomeric rubber-like plug 108, the plug being adapted to abut against ridge 106. The plug 108 includes a fluid path 118 within which the Luer coupling member 110 is coaxially positioned. The plug is provided with radially protruding edges 116 to facilitate proper mounting of the Luer coupling member 110 within the plug 108.

Referring now to FIGS. 10 and 12, a modification of an alternate embodiment 80 of a sampler according to the present invention is shown. In this sampler 80, intended for use as a pressure filter device, the push button of the plunger is removed and replaced by a sleeve 88 provided with internal threading 100, the internally threaded sleeve 88 being integral with the plunger shaft 90 at the top 96. The spring, scale and Vernier are omitted. The sampler 80 also includes a lower barrel member 92 having external threading 94, the lower exteriorly threaded barrel 92 being inserted into the lower portion of the sleeve 96 by means of the complimentary threads 94 and 100 to form an adjustable barrel. With the attachment of a disposable reservoir 62 and filter 64 by means of Luer fittings and the accessory coupling means 82, the sampler becomes a pressure filter. As the barrel is compressed or contracted by relative rotation of the sleeve 88 and barrel 92, the pressure within the sampler chamber 98 will increase. The operating pressure developed in the chamber 98 is limited mostly by the strength of the connection between the disposable reservoir 62 and the adapter couplings including the coupling means 82.

Referring now to FIGS. 15–21, another alternate embodiment of the present invention is shown for use in conjunction with high pressure liquid chromatography, where samples, ordinarily contained in a syringe, are forced under pressure through a tube packed with materials chosen to remove particular components from the sample. This modification attaches directly to the syringe which contains the sample, and with a simple push and twist motion of the plunger, develops pressure to force the sample, unattended, through a filter or a chromatography column.

The device 120 includes a sleeve 128 having a hollow portion 136. The sleeve, at its top end, includes a plunger 122 having a vertical groove 124 intersecting with a pair of spaced apart parallel horizontal grooves 126 provided in the plunger's peripheral face. The lower portion of the plunger 122 is equipped with a conventional coil spring 134 which is mounted at its upper end on a reduced diameter portion 132 of the plunger 122, and extends vertically downwardly within the sleeve 128. A set screw or stop means 130 is provided at the sleeve's upper end to engage the plunger 122 within the grooves 124, 126 provided in the plunger surface. The lower portion of the sleeve 128 is provided with an internal annular groove 140, with the wall 128*a* therebelow having a pair of cut-out portions 140*a* to provide a bayonet type fitting. It will be understood that the cut-out portions 140*a* may extend through the entire thickness of the lower part 128*a* of the sleeve 128.

In operation, a conventional disposable syringe 150, including a finger flange 144, plunger shaft 146 and plunger cap 142, and having a chromatography column or filter 64 attached to its discharge end, filled with reagent and particulates, is locked into the sampler device 120 with the plunger 122 raised. The annular groove 140, is a bayonet type fitting, accepts the flange 144 of the syringe 150. The set screw 130 limits the travel of plunger 122 to vertical and horizontal motion only along the grooves 124 and 126. As the reduced portion 132 of the plunger 122 is of limited length, it does not interfere with the cap 142 of the syringe 150 when the plunger shaft 146 is in the fully extended position. In the beginning position, when the syringe 150 is placed within the sleeve 128 so that the upper surface of the cap 142 approaches and finally abuts the bottom of the spring 134, the plunger 122 is set so that the stop means 130 is in the lowermost horizontal groove 126. The compression of the spring 134, via movement of the plunger 122, forces the plunger shaft 146 in a downward axial direction, thereby expelling filtrate into a container without any further assistance from the operator. This occurs when the plunger 122 is first rotated to align the vertical groove 124 with the stop means 130 and then pressed down and secured in its new position by rotating the plunger 122 until stop means 130 in the form of a set screw is located in the uppermost of the horizontal grooves 126. Similarly, a full syringe may be connected to a chromatography column (not shown), the device attached to the syringe and the plunger 122 depressed to force the sample through the chromatography column in the same way.

With reference to FIGS. 22 and 23, there is shown a closed or pressurized system as represented by the pipes 160 and 162 through which flow a liquid to which it is desirable to add a measured volume of reagent. The pipes 160 and 162 are connected by means of a three-way valve 164, shown in more detail in FIG. 23. The valve 164 is provided with ports 166, 168 and 170, the ports 166 and 168 being male connections, and the port 170 being a female Luer connection. The valve internally is provided with three openings spaced 90° from one another, and with a handle 172 for controlling the position of the valve. For convenience, the handle 172 may suitably point to the closed port, so that in the position illustrated in FIG. 22 the ports 166 and 168 are open, while in the position illustrated in FIG. 23 all three ports are open.

To use the sampler 10 to add a measured volume of reagent to a closed or pressurized system as shown in FIG. 22, the valve 164 is installed in the system line with the port 170 closed, i.e. in the position shown in FIG. 22, and with ports 166 and 168 open so that the pressurized or closed system operates in the normal way. The sampler 10, prior to connection to the port 170, is filled with a measured volume of the desired reagent, and the sampler 10 is then connected by means of its male Luer outlet to the female Luer port 170 of the valve 164 to achieve the construction shown in FIG. 22.

Next, the port 166 or 168 is opened to the sampler 10 by rotation of the valve stem so that the handle 172 points to port 168 or 166, thereby closing that port. Reagent is then introduced into the system by rotating the upper cylindrical member 12 clockwise relative to the fixed lower member 14. Next, the valve stem is turned toward port 170, again as shown in FIG. 22, to isolate the sampler 10 from the closed system and returned the system to its normal operation. The sampler 10 is then removed from the valve 164.

This embodiment may also be used to remove a measured volume from the system by fixing an empty sampler 10 to the port 170 and, in place of the step noted above where reagent is injected into the system, rotating the upper cylinder 12 counterclockwise relative to the fixed lower cylinder 14 to withdraw a sample from the closed system.

It will be obvious to those skilled in the art that various other changes and modifications may be made without departing from the scope of the invention and the invention is not to be considered limited to what is shown in the drawings and described in the specifications.

What is claimed is:

1. An adjustable volume sampler or syringe, useful for the introduction and the dispension of liquid samples therefrom comprising:

an upper hollow tubular member having a central longitudinal axis and a first inner diameter along a majority of the length thereof, and upper and lower ends, said upper member including an inwardly projecting internally threaded region of short length near its said lower end, said internally threaded region having a second inner diameter smaller than said first inner diameter;

a lower hollow tubular member coaxial with said upper tubular member, and having upper and lower ends, said lower member including a partially externally threaded region near its said upper end, said lower member being partially received within and threadedly fastened coaxially within said upper member to define an adjustable volumetric capacity barrel, said lower end of said tubular member having an introduction and discharge opening;

plunger means, coaxial with said upper and lower tubular members, for the introduction or dispension of liquid samples from within said barrel, said plunger means extending from outside of said upper tubular member along and within said upper tubular member and into the interior of said lower tubular member, and having a slidable sealing means at the bottom thereof for sliding contact with an interior of said lower tubular member;

spring biasing means for urging said plunger means in an upward axial direction and comprising a coil spring residing within said upper tubular member above said internally threaded region and encircling a portion of said plunger means, an upper end of said coil spring abutting against an upper portion of said plunger means, and a lower end of said coil spring abutting against said lower tubular member; and stop means at the upper end of said upper tubular member for limiting the upward axial travel of said plunger means.

2. An adjustable volume sampler or syringe in accordance with claim 1, wherein said plunger means includes a shaft having a lower end and a planar flanged upper end defining a first surface, a plunger element comprising said slidable sealing means fastened to said lower end of said shaft, and a single-finger push button having a lower flanged planar end defining a second surface, said first surface being constructed and arranged to be urged by said coil spring in an upward axial direction to abut said second surface, said lower flanged end of said push buttom having an upper annular surface abutting said stop means for limiting the upward travel of said plunger means.

3. An adjustable volume sampler or syringe in accordance with claim 2, wherein said flanged upper end of said shaft has a lower annular surface and said upper portion of said plunger means against which said coil spring abuts in an upward axial direction said lower annular surface of said flanged upper end of said shaft.

4. An adjustable volume sampler or syringe in accordance with claim 2, wherein said flanged upper end of said shaft has a lower annular surface said upper portion of said plunger means against which said coil spring abuts in an upward axial direction said lower annular surface of said flanged upper end of said shaft.

5. An adjustable volume sampler or syringe in accordance with claim 1, wherein said stop means for limiting the upward axial travel of the plunger means comprises an inwardly projecting annular shoulder integrally formed in said upper end of said upper tubular member.

6. An adjustable volume sampler or syringe in accordance with claim 1, wherein said upper end of said upper tubular member includes a generally planar ergonomically shaped finger flanged region integrally formed perpendicular to said central axis.

7. An adjustable volume sampler or syringe in accordance with claim 1, further including coupling means for fastening accessories thereto adjacent said introduction and discharge opening.

8. An adjustable volume sampler or syringe in accordance with claim 7, wherein said coupling means comprises snap-fit fastening members, said snap-fit fastening members constructed so as to secure a Luer fitting thereto.

9. An adjustable volume sampler or syringe in accordance with claim 7, further comprising means defining a second chamber coupled to said barrel through said coupling means.

10. An adjustable volume sampler or syringe in accordance with claim 7, further comprising a three-way valve for coupling with a closed or pressurized system, said three-way valve having a port coupled with said coupling means.

11. An adjustable volume sampler or syringe in accordance with claim 7, further comprising a filter chamber coupled to said barrel through said coupling means.

12. An adjustable volume sampler or syringe in accordance with claim 7, further comprising means defining a pipette filling and adjusting accessory coupled to said barrel through said coupling means.

13. An adjustable volume sampler or syringe in accordance with claim 7, further comprising means for effecting repetitive displacement sampling coupled to said barrel through said coupling means.

14. An adjustable volume sampler or syringe in accordance with claim 1, wherein said barrel on its exterior surfaces includes a Vernier Scale indicia.

15. An adjustable volume sampler or syringe in accordance with claim 1, wherein said barrel, said plunger means, and said stop means to limit travel of said plunger means, are formed of plastic.

16. An adjustable volume sampler or syringe in accordance with claim 1, wherein said lower tubular member is formed of transparent or translucent plastic.

* * * * *